Nov. 20, 1934.  G. S. SCOTT  1,981,430
CONTROL MECHANISM FOR FISHING REELS
Filed March 23, 1934
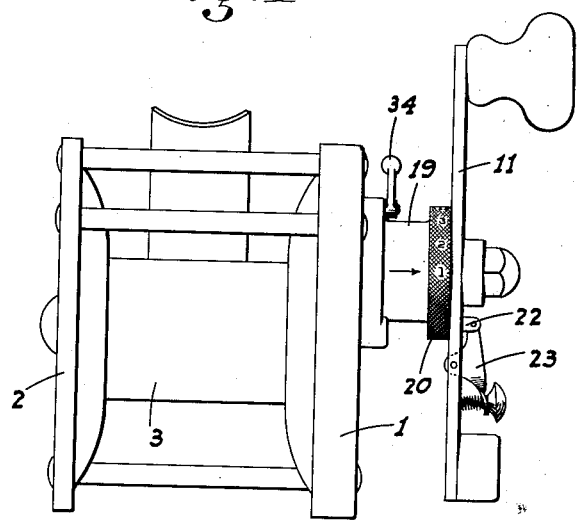
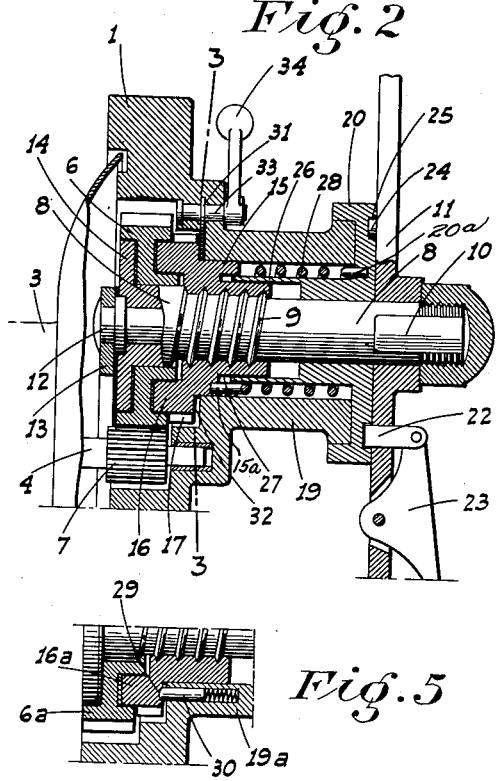
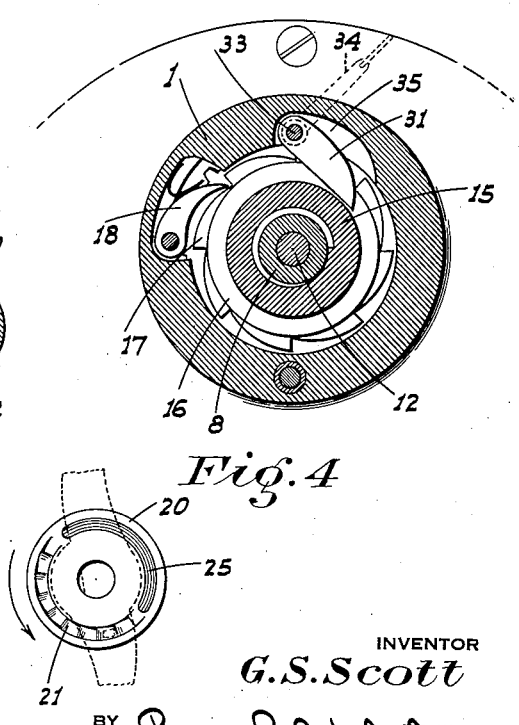
INVENTOR
G. S. Scott
BY
ATTORNEY Patented Nov. 20, 1934

1,981,430

UNITED STATES PATENT OFFICE 1,981,430

CONTROL MECHANISM FOR FISHING REELS

George S. Scott, Fresno, Calif.

Application March 23, 1934, Serial No. 717,056

8 Claims. (Cl. 242—84.5)

This invention relates to fishing reels, and particularly represents improvements over the structure shown in my co-pending application for patent, Serial No. 707,241, filed January 19, 1934.

The pricipal objects of this present invention are to improve the mounting of the torque spring which controls the amount of drag on the reel and the means for adjusting the same; and to provide a selectively operable means to prevent release of the drag by a backward movement of the reel handle and which ordinarily will effect such release.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views;

Figure 1 is a plan view of a reel equipped with my improved structure.

Figure 2 is a fragmentary enlarged diametral section of the reel control mechanism.

Figure 3 is a fragmentary section on the line 3—3 of Figure 2.

Figure 4 is a face view of the adjustable spring tensioning cap detached.

Figure 5 is a fragmentary radial section of a reel mechanism showing a modified means to resist rotative movement of the friction disk with the screw shaft.

Referring now more particularly to the characters of reference on the drawing, the reel as usual comprises a pair of spaced heads 1 and 2 between which the reel spool 3 is disposed. One end of the spindle 4 of the spool is turnably mounted in the head 1 as usual while its opposite end is suitably journaled in the head 2.

Mounted in the head 1 between its outer face and the adjacent end of the spool is a gear 6 which constantly engages a pinion 7 fixed on the adjacent end of the spindle 4. The gear is turnably and slidably mounted on the adjacent portion of a hollow shaft 8 which outwardly of said gear is provided with left hand threads 9 for a certain portion of its length. Beyond the threaded portion the shaft projects clear of the head and has a reduced portion 10 arranged to non-turnably project into the hub of the usual crank handle bar 11.

The sleeve 8 is turnably mounted on a spindle 12 which at its inner end is rigidly fixed on a member 13 secured to the inner face of the head 1. The shaft 8 behind the gear is formed with a disk 14 to frictionally engage the adjacent face of the gear. Threaded on the screw 9 is a sleeve 15 having at its end adjacent the gear an enlarged disk 16 which frictionally engages the adjacent face of the gear. Ratchet teeth 17 extend about the periphery of the disk outwardly of the gear, which are engaged by a spring pressed pawl 18 pivoted in connection with the head 1.

The portion of the sleeve 15 adjacent the disk 16 turnably and slidably engages the bore of a tubular housing or boss 19 formed with and projecting outwardly from the head 1, the boss terminating short of the handle bar 11. The teeth 17 are arranged to prevent advancing rotation of the sleeve along the threads 9 except for the arcuate distance between adjacent teeth.

Turnably mounted on the shaft 8 just inwardly of the handle bar and extending over the outer end of the boss 19 is a knurled cap 20 having a circumferentially extending row of ratchet teeth 21 in its outer face. These are adapted to be engaged by a spring pressed pawl 22 mounted in the handle bar 11 for movement parallel to the shaft, and which pawl is connected to a release lever 23 mounted on said bar. The pawl and ratchets are disposed so that the cap may be freely turned to the left for a certain distance, the possible movement of the cap in either direction being limited by a fixed pin 24 projecting from the inner face of the handle bar and riding in a segmental groove 25 in the outer face of the cap.

The hub of the cap is provided with an inward extension 26 which slidably and turnably projects over the adjacent reduced portion of the sleeve 15 and terminates in a circumferential groove 27 formed in the boss engaging portion of said sleeve. Disposed about said hub and extension is a torque spring 28 which at one end is connected to the cap 20 as at 20a and at the other end to the boss engaged portion of the sleeve 15 as at 15a outwardly of the groove 27. This spring is arranged to be placed under tension by rotation of the cap to the left.

The extension 26 about which the spring 28 is disposed closes the relatively deep gap formed between the adjacent ends of the cap hub and sleeve 15 and prevents the spring when placed under tension from becoming distorted and catching in said gap. The spring 28 when under tension tends, as in the previous structure, to rotate the friction member 15—16 in one direction, and the shaft 8 through the connection with the cap and handle bar in the other direction. Either of the above directions of the corresponding parts is that which will cause the friction member to be advanced along the shaft and into frictional engagement with the gear 6. The frictional pressure is obviously governed by the amount of tension of the spring, which is determined by the amount the cap 20 is rotated from a normal slack-spring position.

If the spring is always maintained with some tension as is desirable, except when the reel spool is to run entirely free, it insures the advance of the friction member into positive frictional cooperation with the gear when the handle bar is manually turned in a line winding direction, and avoids the possibility of said member turning with the screw shaft and without moving along the same as might otherwise be the case.

The same action as far as insuring advancing of the friction member with the rotation of the screw shaft, is had by means of the structure shown in Figure 5. In this case the outer face of the friction disk 16a is provided with shallow sockets 29 into one of which at a time a spring pressed pin 30 projects. This pin is mounted in the boss 19a parallel to the screw shaft and yieldably holds the friction member against rotation with the screw shaft until said member has been advanced into positive frictional cooperation with the gear 6a by the relative rotation of the screw shaft.

When it is desired to release the tension of the spring 28 it is only necessary to depress the lever 23, which withdraws the pawl 22 from the ratchet teeth 21 and allows the cap to rotate to its initial position by the unwinding action of the spring. The groove 25 and pin 24 are arranged so that the spring may be slacked off entirely if desired by allowing the cap to rotate to its limit in the necessary direction to accomplish this.

When the handle bar is turned backward or in an anti-clockwise direction, the friction disk 16 is withdrawn from engagement with the gear and the reel spool and line can run free. To prevent such free running if desired, irrespective of any backward pressure which may be imparted to the handle, I provide the following means:

Pivoted at one end in the housing 1 outwardly of the disk 16 is a shim 31, disposed in the plane of and nearly as wide as the space 32 between the outer face of the disk and the adjacent end surface of the boss 19, said surface limiting the movement of the friction disk in a gear disengaging direction. The shaft 33 of the shim is parallel to the screw shaft and is connected to an operating arm 34 disposed on the outside of the housing and boss in a position convenient to the operator. When the arm is turned in one direction the free end of the shim is moved into the space 32 and forms an abutment positively preventing retractive movement of the disk 16 relative to the gear 6 irrespective of the rotation of the screw shaft. When the arm is turned in the opposite direction the shim is moved out of said space and into a recess 35 provided therefor in the housing 1.

By means of this last described arrangement it will be evident that the reel may be allowed to run free without any handle manipulation and without having to maintain hand pressure on any part, and is useful when casting and the like. At the same time the shim in no way interferes with the advancing of the friction disk into cooperating engagement with the gear with the turning of the handle in the requisite direction.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a fishing reel having a reel spool and a driving gear operatively connected thereto, a friction element to engage the gear and movable axially thereof, manually operable means for rotating the element and for moving the same toward and away from the gear whereby to place the element in and out of driving engagement with the gear, and selectively operable means to prevent retractive movement of the element.

2. In a fishing reel having a reel spool and a driving gear operatively connected thereto, a friction element to engage the gear and movable axially thereof, a fixed head in which said element is mounted, hand means for moving the element toward and from the gear and for rotating the element when frictionally engaged with the gear, the head having an interior surface limiting the retractive movement of the element away from the gear, and a member movable at will into the space between the element and said surface to prevent movement of the element away from the gear.

3. In a fishing reel having a reel spool and a driving gear operatively connected thereto, a friction element to engage the gear and movable axially thereof, manually operable means for rotating the element and for moving the same toward and away from the gear whereby to place the element in and out of driving engagement with the gear, and a member movable at will into the path of retractive movement of the element to prevent such movement.

4. In a fishing reel having a reel spool and a driving gear operatively connected thereto, a friction element to engage the gear and movable axially thereof, a fixed head in which said element is mounted, hand means for moving the element toward and from the gear and for rotating the element when frictionally engaged with the gear, the head having an interior surface limiting the retractive movement of the element away from the gear, a shim in the head disposed in the plane of the space between the element and said head surface, a pivot for one end of the shim disposed parallel to the axis of the element, and clear of said space, and an operating arm connected to said pivot outside the head to turn the shim so that its free end will project into the space between said head surface and the element to prevent retractive movement of the element relative to the gear.

5. In a fishing reel having a reel spool and a driving gear operatively connected thereto, a friction element to engage the gear, a hand turned screw shaft mounted separately from but axially of the gear and on which said element is threaded whereby when the element is advanced into engagement with the gear said element will rotate with the shaft to drive the gear, and yieldable means preventing rotation of the element with the shaft when the element is free of the gear and the shaft is being turned in an element advancing direction, said yieldable means comprising a spring pressed pin mounted in a fixed position relative to the element and shallow depressions in the element to receive one end of the pin.

6. In a fishing reel having a reel spool and a driving gear operatively connected thereto, a hand turned screw shaft mounted separate from but axially of the gear, a sleeve threaded on said shaft and having an enlarged disk to frictionally engage the gear, an adjustable cap having a hub turnably engaging the shaft outwardly of the sleeve, a torque spring extending over the hub and sleeve and connected at its ends to the cap and to the sleeve respectively and an extension on the cap hub overlapping the sleeve; said sleeve having an enlarged portion at the adjacent end of the spring provided with an annular groove into which the adjacent end of the extension slidably projects.

7. In a fishing reel having a reel spool and a driving gear operatively connected thereto, a hand turned screw shaft mounted separate from but axially of the gear, a friction element for cooperation with the gear threaded on the shaft, means acting on the element to prevent rotation of the same in an advancing direction, a handle bar on the outer end of the shaft, a cap turnably mounted on the shaft adjacent the handle bar, a torque spring about the shaft and connected to the cap and element, and tending to advance the latter, and releasable means between the handle and cap normally allowing adjustable rotation of the cap on the shaft only in the direction tending to increase the tension of the spring.

8. A structure as in claim 7, said releasable means comprising a circumferential row of ratchet teeth on the outer face of the cap, a pawl to engage the teeth projecting through the handle bar, a lever pivoted intermediate its ends on the outer face of the bar and to one end of which the pawl is connected, and a spring acting on the lever to hold the pawl in yieldable engagement with the teeth.

GEORGE S. SCOTT.